(12) United States Patent
Kim et al.

(10) Patent No.: US 8,280,204 B2
(45) Date of Patent: Oct. 2, 2012

(54) OPTICAL WIRING BOARD AND MANUFACTURING METHOD THEREOF

(75) Inventors: Sang-Hoon Kim, Goonpo-si (KR); Han-Seo Cho, Daejeon (KR); Joon-Sung Kim, Suwon-si (KR); Jae-Hyun Jung, Ansan-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 239 days.

(21) Appl. No.: 12/760,035

(22) Filed: Apr. 14, 2010

(65) Prior Publication Data
US 2011/0116736 A1 May 19, 2011

(30) Foreign Application Priority Data

Nov. 13, 2009 (KR) .................. 10-2009-0109778

(51) Int. Cl.
*G02B 6/12* (2006.01)
(52) U.S. Cl. ............................................. 385/14
(58) Field of Classification Search .................. 385/14
See application file for complete search history.

(56) References Cited

U.S. PATENT DOCUMENTS

| | | | |
|---|---|---|---|
| 6,438,281 B1 * | 8/2002 | Tsukamoto et al. | 385/14 |
| 7,596,289 B2 * | 9/2009 | Yamamoto et al. | 385/14 |
| 7,724,989 B2 * | 5/2010 | Kodama et al. | 385/14 |
| 2005/0238278 A1 * | 10/2005 | Nakashiba et al. | 385/14 |
| 2008/0118199 A1 * | 5/2008 | Asai et al. | 385/14 |
| 2009/0290832 A1 * | 11/2009 | Kim et al. | 385/14 |
| 2010/0061679 A1 * | 3/2010 | Hayashi et al. | 385/14 |
| 2010/0202729 A1 * | 8/2010 | Kodama et al. | 385/14 |
| 2011/0116737 A1 * | 5/2011 | Kim et al. | 385/14 |

FOREIGN PATENT DOCUMENTS

| | | |
|---|---|---|
| JP | 2004-163722 | 6/2004 |
| KR | 10-2009-0113147 | 10/2009 |

OTHER PUBLICATIONS

Korean Office Action, with partial English translation, issued in Korean Patent Application No. 10-2009-0109778, mailed Mar. 24, 2011.

* cited by examiner

*Primary Examiner* — Sung Pak
(74) *Attorney, Agent, or Firm* — McDermott Will & Emery LLP (57) ABSTRACT

An optical wiring board and a manufacturing method thereof are disclosed. In accordance with an embodiment of the present invention, the method includes providing a base substrate having an optical waveguide layer with a mirror groove formed on one surface thereof and a first insulation layer stacked on one surface of the optical waveguide layer and having a through-hole connected with the mirror groove formed thereon, forming a metal mirror layer connected from the mirror groove to an inner wall of the through-hole and forming an electrode pad on a side of the other surface of the optical waveguide layer, in which the electrode pad is disposed in accordance with the position of the metal mirror layer.

13 Claims, 10 Drawing Sheets

OPTICAL WIRING BOARD AND MANUFACTURING METHOD THEREOF

CROSS-REFERENCE TO RELATED APPLICATIONS

This application claims the benefit of Korean Patent Application No. 10-2009-0109778, filed with the Korean Intellectual Property Office on Nov. 13, 2009, the disclosure of which is incorporated herein by reference in its entirety.

BACKGROUND

1. Technical Field

The present invention is related to an optical wiring board and a manufacturing method thereof.

2. Description of the Related Art

Due to the high speed and large capacity of data processed in electronic components, the conventional printed circuit board technology using copper-based electrical wiring patterns has reached its limit. In order to overcome the problems of the conventional copper-based electrical wiring patterns, optical wiring boards including optical waveguide are recently receiving attention.

In the optical wiring board including the optical waveguide, the optical waveguide that can transceive signals through light by using polymers and optical fibers is inserted in a printed circuit board, and this is referred to as an electro-optical circuit board (EOCB). The EOCB is commonly employed in switches and transceiving devices of a communication network, switches and servers for data communication, communication for the aerospace industry and the avionics, mobile phone base stations of a universal mobile telecommunication system (UMTS) and the backplane and daughter board of a super computer.

The optical wiring board requires that a mirror be formed in the optical waveguide to change the optical path.

In the conventional technology, a metal is coated on a mirror groove by way of sputtering or E-beam evaporation in order to form the mirror in the optical waveguide.

In the sputtering or E-beam evaporation, however, a relatively large quantity of metal is used to coat an area, and an expensive metal, such as gold, is used, increasing the production cost.

Furthermore, although the plating method is inexpensive to perform, the plating layer may not be properly adhered to an optical waveguide layer.

SUMMARY

The present invention provides an optical wiring board and a method of manufacturing the same that allow a mirror layer made of a metallic material to be formed efficiently on the optical wiring board.

An aspect of the present invention provides a method of manufacturing an optical wiring board. In accordance with an embodiment of the present invention, the method includes providing a base substrate having an optical waveguide layer with a mirror groove formed on one surface thereof and a first insulation layer stacked on one surface of the optical waveguide layer and having a through-hole connected with the mirror groove formed thereon, forming a metal mirror layer connected from the mirror groove to an inner wall of the through-hole and forming an electrode pad on a side of the other surface of the optical waveguide layer, in which the electrode pad is disposed in accordance with the position of the metal mirror layer.

The forming of the electrode pad can include stacking a metal layer on the side of the other surface of the optical waveguide layer and forming a circuit pattern having the electrode pad by selectively removing the metal layer.

The method can include stacking a transparent second insulation layer on the other surface of the optical waveguide layer, and the metal layer can be stacked on the second insulation layer.

The providing of the base substrate can include preparing the optical waveguide layer, stacking the first insulation layer having the through-hole formed therein on one surface of the optical waveguide layer and forming the mirror groove in one surface of the optical waveguide layer exposed through the through-hole.

The forming of the metal mirror layer can include forming a plating layer on the mirror groove and the inner wall of the through-hole.

The method can further include forming a via-hole in the base substrate, prior to the forming of the metal mirror layer, and the forming of the metal mirror layer can include forming a plating layer on an inner wall of the via-hole.

The method can further include forming a solder resist layer on the first insulation layer in such a way that the mirror groove and the through-hole are filled.

The method can further include forming a solder resist layer on the side of the other surface of the optical waveguide layer in such a way that the electrode pad is selectively exposed.

Another aspect of the present invention provides an optical wiring board that includes an optical waveguide layer having a mirror groove formed in one surface thereof, a first insulation layer, which is stacked on one surface of the optical waveguide layer and has a through-hole formed therein and in which the through-hole exposes the mirror groove, a metal mirror layer, which is connected from the mirror groove to an inner wall of the through-hole, and an electrode pad, which is formed on a side of the other surface of the optical waveguide layer and in which the side of the other surface is flat and the electrode pad is disposed in accordance with the position of the metal mirror layer.

The optical wiring board can further include a transparent second insulation layer stacked on the other surface of the optical waveguide layer, and the electrode pad can be formed on the second insulation layer.

The optical wiring board can further include a solder resist layer stacked on the first insulation layer in such a way that the mirror groove and the through-hole are filled.

The optical wiring board can further include a solder resist layer stacked on the side of the other surface of the optical waveguide layer in such a way that the electrode pad is exposed.

The optical wiring board can further include a coverlay covering an exposed portion of the optical waveguide layer.

Additional aspects and advantages of the present invention will be set forth in part in the description which follows, and in part will be obvious from the description, or may be learned by practice of the invention.

DETAILED DESCRIPTION

The features and advantages of this invention will become apparent through the below drawings and description.

Figure 1:
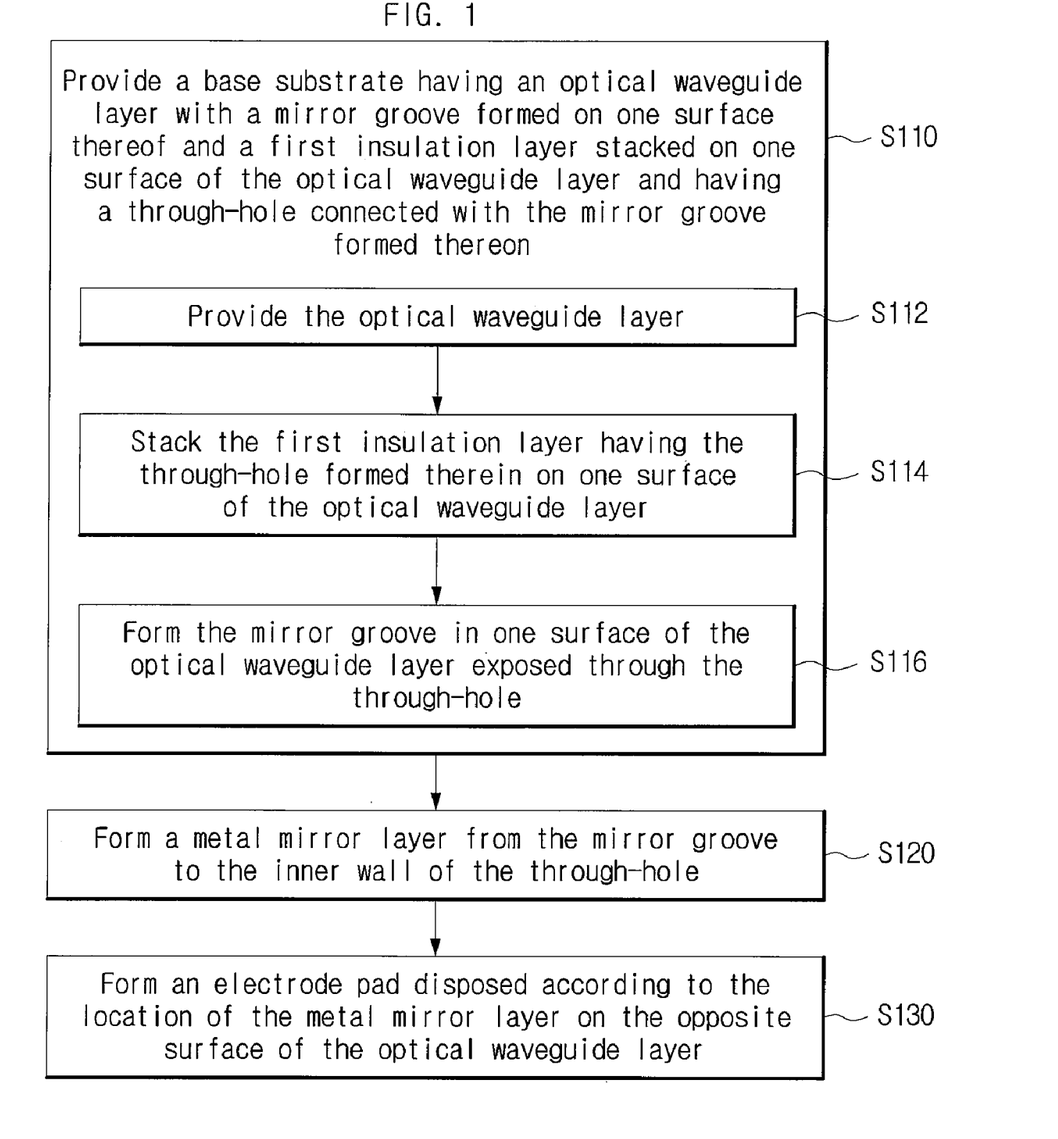
FIG. 1 is a flowchart illustrating a method of manufacturing an optical wiring board in accordance with an embodiment of the present invention.

FIG. 1 is a flowchart illustrating a method of manufacturing an optical wiring board in accordance with an embodiment of the present invention, and FIGS. 2 to 9 are cross-sectional views illustrating the method of manufacturing an optical wiring board in accordance with an embodiment of the present invention.

The method of manufacturing an optical wiring board in accordance with an embodiment of the present invention includes providing a base substrate (S110), forming a metal mirror layer (S120) and forming an electrode pad (S130).

Provided in the providing of the base substrate (S110) is a base substrate, which includes an optical waveguide layer 20 and a first insulation layer 30. A mirror groove 25 is formed in one surface of the optical waveguide layer 20, and the first insulation layer 30 is stacked on one surface of the optical waveguide layer 20. Formed in the first insulation layer 30 is a through-hole 32, which is connected with the mirror groove 25. Accordingly, the mirror groove 25 is exposed through the first insulation layer 30 stacked on the optical waveguide layer 20.

For this, as illustrated in FIGS. 2 to 6, the processes for providing the base substrate (S110) in accordance with the present embodiment includes providing the optical waveguide layer 20 (S112), stacking the first insulation layer 30 having the through-hole 32 formed therein on one surface of the optical waveguide layer 20 (S114) and forming the mirror groove 25 in one surface of the optical waveguide layer 20 exposed through the through-hole 32 (S116).

Figure 2:
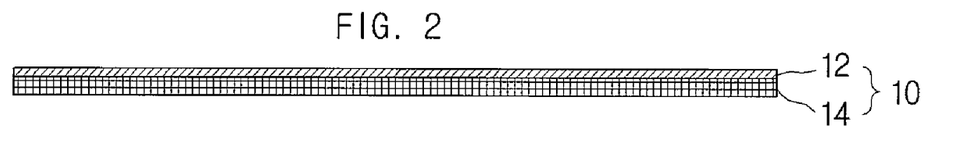
FIGS. 2 to 9 are cross-sectional views illustrating a method of manufacturing an optical wiring board in accordance with an embodiment of the present invention.
Figure 3:
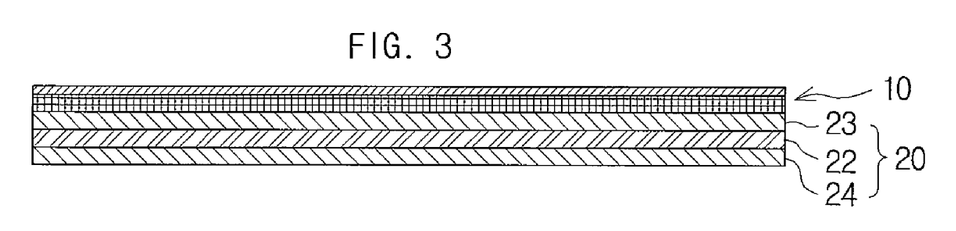

Specifically, the optical waveguide layer 20 becomes a path for transmitting an optical signal. In the present embodiment, as illustrated in FIGS. 2 and 3, the optical waveguide layer 20 can be formed by successively stacking a first clad layer 23, a core layer 22 and a second clad layer 24 on a metal clad laminate 10 on which a copper thin film and a polyimide layer are successively stacked. Here, the stacking for forming the optical waveguide layer 20 can be performed by various known methods such as spin coating, dispensing, ink jetting and vacuum laminating. Also, the optical waveguide layer 20 can be patterned by various known methods such as exposing/developing, UV-molding and laser patterning.

In this embodiment, by stacking the optical waveguide layer 20 on the metal clad laminate 10 having a flat structure, the opposite side of the metal clad laminate 10 on which the optical waveguide layer 20 is stacked can have a flat structure.

Figure 4:
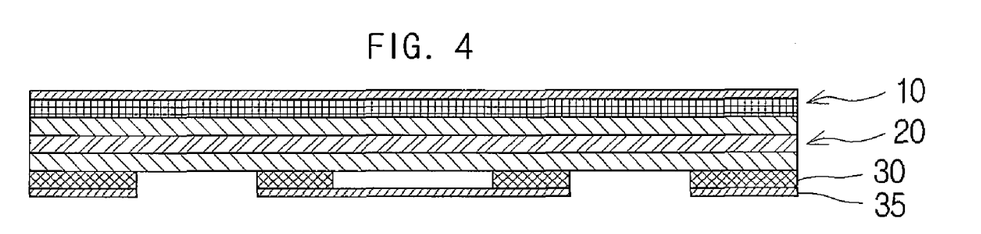
Figure 5:
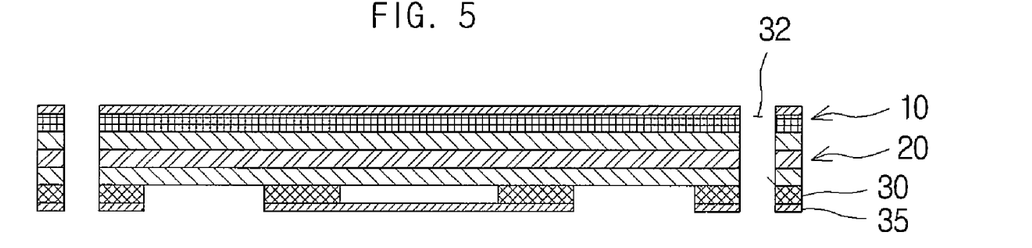

Next, as illustrated in FIGS. 4 and 5, the through-hole 32 can be pre-formed in the first insulation layer 30 in accordance with where the mirror groove 25 is to be formed, and then the first insulation layer 30 can be stacked on one surface of the optical waveguide layer 20. As a result, the inner wall of the through-hole 32 can be formed smooth, and no pollutant can be left inside the through-hole 32, thereby preventing the optical waveguide layer 20 from contamination or damage during a process of forming the through-hole 32. However, this is not intended to limit the forming of the through-hole 32 to this embodiment, and the through-hole 32 can be formed by other various known methods, for example, forming the through-hole 32 after stacking the first insulation layer 30.

Figure 6:
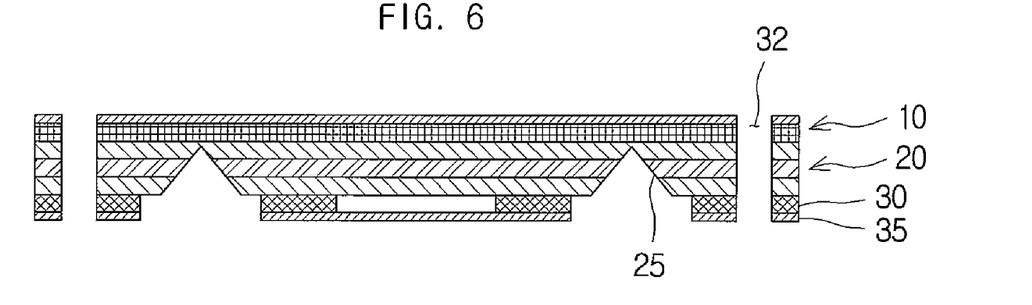

Next, as illustrated in FIG. 6, a V-shaped mirror groove 25 can be formed in the optical waveguide layer 20 exposed through the through-hole 32 by way of mechanical processing using, for example, a dicing blade. However, this is not intended to limit the shape and forming of the mirror groove 25 to this embodiment, and the shape and forming of the mirror groove 25 can be performed by other various known methods. Moreover, unlike the present embodiment, the through-hole 32 can be formed after the mirror groove 25 is formed.

In the forming of the metal mirror layer (S120), a metal mirror layer 40 is formed from the mirror groove 25 to the inner wall of the through-hole 32. The metal mirror layer 40 is a part that refracts an optical signal transferred through the optical waveguide layer 20 and guides the optical signal to a device, for example, a photoelectric device.

In this embodiment, the first insulation layer 30 is made of a material that has a higher adhesive strength with metals than the optical waveguide layer 20 does, and thus the metal mirror layer 40 can be firmly coupled to the inner wall of the through-hole 32. Moreover, since the metal mirror layer 40 is coupled to the mirror groove 25 and the inner wall of the through-hole 32, the contact area can be increased, and thus the coupling strength of the metal mirror layer 40 can be increased. That is, the metal mirror layer 40 can be stably formed on the mirror groove 25.

Figure 7:
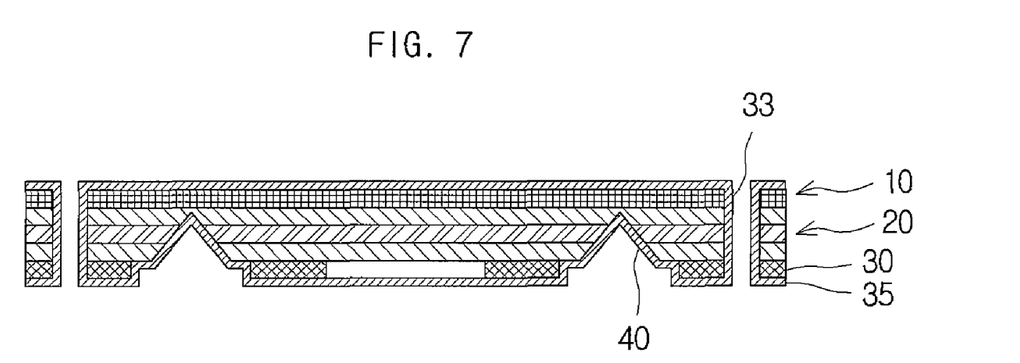

Accordingly, as illustrated in FIG. 7, the metal mirror layer 40 can be formed by plating the mirror groove 25 and the inner wall of the through-hole 32. As a result, a mirror can be formed in the optical waveguide layer 20 at lower costs.

To form a via-hole with the metal mirror layer 40 at the same time, prior to the forming of the metal mirror layer (S120), the via-hole can be first formed in the base substrate (refer to FIG. 5), and then a plating layer can be formed on the inner wall of the via-hole as well as on the metal mirror layer 40.

Furthermore, if the optical waveguide layer 20 of any portion other than the portion where the mirror groove 25 is formed is exposed, a plating protection layer 35, which selectively covers the exposed portion of the optical waveguide layer 20, can be additionally formed.

In the forming of the electrode pad (S130), an electrode pad 13 disposed according to the location of the metal mirror layer 40 is formed on the opposite surface of the optical waveguide layer 20. Accordingly, a photoelectric device can be mounted on the opposite surface of the optical waveguide layer 20. Particularly, in the present embodiment, the opposite surface of the optical waveguide layer 20 is formed in a flat structure, and thus a solder can be better printed on the electrode pad 13 by way of printing, thereby facilitating the mounting of the photoelectric device.

Figure 8:
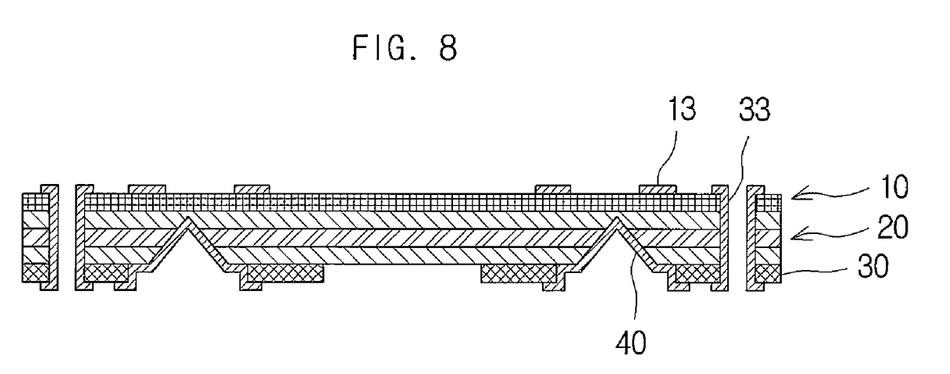

In this embodiment, as illustrated in FIG. 8, after a metal layer 12 is stacked on the opposite surface of the optical waveguide layer 20 (refer to FIGS. 2 and 3), the metal layer 12 can be selectively removed to form a circuit pattern having the electrode pad 13.

Here, it is possible that a transparent second insulation layer 14 (the polyimide layer of FIG. 1) is stacked on the surface of the optical waveguide layer 20 that is opposite to the metal mirror layer 40, and then the metal layer 12 can be stacked on the second insulation layer 14. Accordingly, the electrode pad 13 can be firmly coupled to the second insulation layer 14, and an optical signal transferred from the optical waveguide layer 20 can be transferred to the photoelectric device through the transparent second insulation layer 14.

The method of manufacturing an optical wiring board in accordance with an embodiment of the present invention can further include forming a solder resist layer 50 in order to protect a circuit pattern or the metal mirror layer 40.

Figure 9:
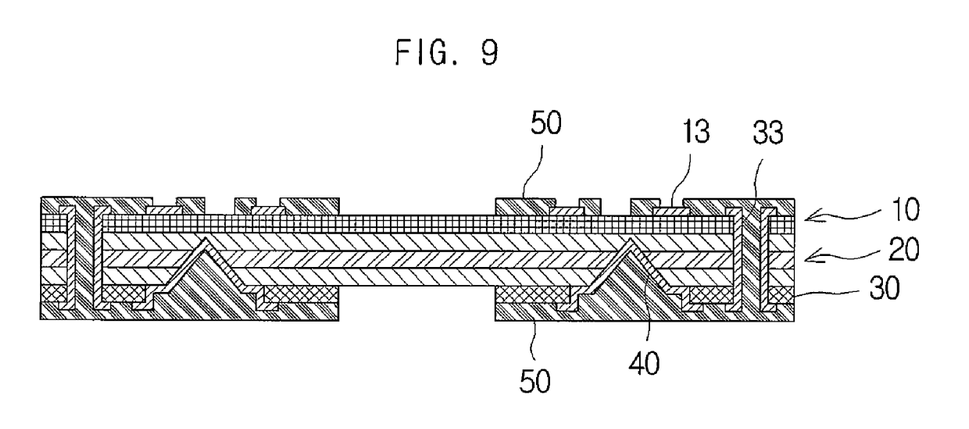

As illustrated in FIG. 9, the metal mirror layer 40 can be protected by forming the solder resist layer 50 on the first insulation layer 30 in such a way that the mirror groove 25 and the through-hole 32 are filled.

Then, the solder resist layer 50 is formed on the opposite surface of the optical waveguide layer 20 so that a circuit pattern connected to an electrode pattern can be protected. Here, the solder resist layer 50 is formed in such a way that the electrode pad 13 is exposed and thus a solder can be attached to the electrode pad 13.

In the following description, an optical wiring board in accordance with an embodiment of the present invention will be described.

Figure 10:
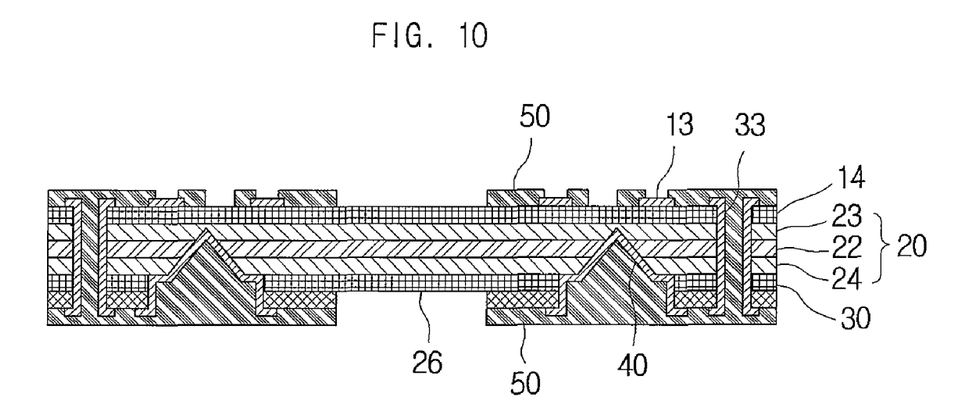
FIG. 10 is a cross-sectional view of an optical wiring board in accordance with an embodiment of the present invention.

FIG. 10 is a cross-sectional view of an optical wiring board in accordance with an embodiment of the present invention.

The optical wiring board in accordance with an embodiment of the present invention includes an optical waveguide layer 20, a first insulation layer 30, a metal mirror layer 40 and an electrode pad 13.

The optical waveguide layer 20 is a path for transferring an optical signal. In this embodiment, the optical waveguide layer 20 is formed by successively stacking a first clad layer 23, a core layer 22 and a second clad layer 24. Then, a mirror groove 25 is formed in one surface of the optical waveguide layer 20 in accordance with where a photoelectric device is formed.

The first insulation layer 30 is a part where a through-hole 32 exposing the mirror groove 25 is formed, and stacked on one surface of the optical waveguide layer 20.

The metal mirror layer 40 is a part that refracts an optical signal transferred through the optical waveguide layer 20 and guides the optical signal to a device, for example, a photoelectric device, and is formed to be connected from the mirror groove 25 to the inner wall of the through-hole 32.

In this embodiment, the first insulation layer 30 is made of a material that has a higher adhesive strength with metals than the optical waveguide layer 20 does, and thus the metal mirror layer 40 can be firmly coupled to the inner wall of the through-hole 32. Moreover, since the metal mirror layer 40 is coupled to the mirror groove 25 and the inner wall of the through-hole 32, the contact area can be increased, and thus the coupling strength of the metal mirror layer 40 can be increased. That is, the metal mirror layer 40 can be stably formed on the mirror groove 25.

Accordingly, the metal mirror layer 40 can be formed by plating the mirror groove 25 and the inner wall of the through-hole 32. As a result, a mirror can be formed in the optical waveguide layer 20 at lower costs.

The electrode pad 13 is a part on which a photoelectric device is mounted. The electrode pad 13 is formed on the opposite surface of the optical waveguide layer 20 and disposed to correspond to the location of the metal mirror layer 40. Particularly, in the present embodiment, the opposite surface of the optical waveguide layer 20 is formed in a flat structure, and thus a solder can be better printed on the electrode pad 13 by way of printing, thereby facilitating the mounting of the photoelectric device.

Here, it is possible that a transparent second insulation layer 14 is stacked on the surface of the optical waveguide layer 20 that is opposite to the metal mirror layer 40, and the electrode pad 13 can be formed on the second insulation layer 14. Accordingly, the electrode pad 13 can be firmly coupled to the second insulation layer 14, and an optical signal transferred from the optical waveguide layer 20 can be transferred to the photoelectric device through the transparent second insulation layer 14.

The optical wiring board of the present embodiment can have a solder resist layer 50 additionally formed therein in order to protect a circuit pattern or the metal mirror layer 40.

Specifically, the metal mirror layer 40 can be protected by forming the solder resist layer 50 on the first insulation layer 30 in such a way that the mirror groove 25 and the through-hole 32 are filled. Then, the solder resist layer 50 is formed on the opposite surface of the optical waveguide layer 20 also so that a circuit pattern connected to an electrode pattern can be protected. Here, the solder resist layer 50 is formed in such a way that the electrode pad 13 is exposed and thus a solder can be attached to the electrode pad 13.

Furthermore, the optical wiring board of the present embodiment can further include a coverlay 26, which covers the exposed portion of the optical waveguide layer 20, in order to protect the optical waveguide layer 20 exposed to the outside.

According to an embodiment of the present invention, a mirror can be formed in an optical waveguide at lower costs by stably forming a metal mirror layer on a mirror groove by way of plating.

Furthermore, a photoelectric device can be better mounted by forming an electrode pad on an opposite, flat surface of the mirror.

While the spirit of the present invention has been described in detail with reference to a particular embodiment, the embodiment is for illustrative purposes only and shall not limit the present invention. It is to be appreciated that those skilled in the art can change or modify the embodiment without departing from the scope and spirit of the present invention.

As such, many embodiments other than that set forth above can be found in the appended claims.

What is claimed is:

1. A method of manufacturing an optical wiring board, the method comprising:

providing a base substrate, the base substrate comprising an optical waveguide layer and a first insulation layer, the optical waveguide layer having a mirror groove formed in one surface thereof, the first insulation layer being stacked on one surface of the optical waveguide layer and having a through-hole formed therein, the through-hole being connected with the mirror groove;

forming a metal mirror layer connected from the mirror groove to an inner wall of the through-hole; and forming an electrode pad on a side of the other surface of the optical waveguide layer, the electrode pad being disposed in accordance with the position of the metal mirror layer.

2. The method of claim 1, wherein the forming of the electrode pad comprises:

stacking a metal layer on the side of the other surface of the optical waveguide layer; and forming a circuit pattern having the electrode pad by selectively removing the metal layer.

3. The method of claim 2, comprising stacking a transparent second insulation layer on the other surface of the optical waveguide layer, wherein the metal layer is stacked on the second insulation layer.

4. The method of claim 1, wherein the providing of the base substrate comprises:

preparing the optical waveguide layer;

stacking the first insulation layer having the through-hole formed therein on one surface of the optical waveguide layer; and forming the mirror groove in one surface of the optical waveguide layer exposed through the through-hole.

5. The method of claim 1, wherein the forming of the metal mirror layer comprises forming a plating layer on the mirror groove and the inner wall of the through-hole.

6. The method of claim 5, further comprising forming a via-hole in the base substrate, prior to the forming of the metal mirror layer,
wherein the forming of the metal mirror layer comprises forming a plating layer on an inner wall of the via-hole.

7. The method of claim 1, further comprising forming a solder resist layer on the first insulation layer in such a way that the mirror groove and the through-hole are filled.

8. The method of claim 1, further comprising forming a solder resist layer on the side of the other surface of the optical waveguide layer in such a way that the electrode pad is selectively exposed.

9. An optical wiring board comprising:
an optical waveguide layer having a mirror groove formed in one surface thereof;
a first insulation layer being stacked on one surface of the optical waveguide layer and having a through-hole formed therein, the through-hole exposing the mirror groove;
a metal mirror layer connected from the mirror groove to an inner wall of the through-hole; and
an electrode pad formed on a side of the other surface of the optical waveguide layer, the side of the other surface being flat, the electrode pad being disposed in accordance with the position of the metal mirror layer.

10. The optical wiring board of claim 9, further comprising a transparent second insulation layer stacked on the other surface of the optical waveguide layer,
wherein the electrode pad is formed on the second insulation layer.

11. The optical wiring board of claim 9, further comprising a solder resist layer stacked on the first insulation layer in such a way that the mirror groove and the through-hole are filled.

12. The optical wiring board of claim 9, further comprising a solder resist layer stacked on the side of the other surface of the optical waveguide layer in such a way that the electrode pad is exposed.

13. The optical wiring board of claim 9, further comprising a coverlay covering an exposed portion of the optical waveguide layer.

* * * * *